(12) United States Patent
Straley

(10) Patent No.: US 6,329,732 B1
(45) Date of Patent: Dec. 11, 2001

(54) ELECTRIC MOTORS AND METHODS FOR ASSEMBLING TEMPERATURE SENSORS THEREIN

(75) Inventor: Larry W. Straley, El Paso, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/357,031

(22) Filed: Jul. 20, 1999

(51) Int. Cl.⁷ ................................................ H02K 11/00
(52) U.S. Cl. .................. 310/68 B; 310/68 C; 310/67 R; 29/596
(58) Field of Search ............................. 29/596, 597, 598, 29/605, 606; 310/254, 260, 68 C, 68 A, 68 B, 68 E, 68 R, 67 R

(56) References Cited

U.S. PATENT DOCUMENTS

| | | | |
|---|---|---|---|
| 1,947,078 | * | 2/1934 | Cobb ........................................ 172/36 |
| 2,471,840 | * | 5/1949 | Seely ...................................... 171/252 |
| 3,131,322 | * | 4/1964 | Pleiss, Jr. et al. ...................... 310/68 |
| 4,188,553 | * | 2/1980 | Wheaton ............................. 310/68 C |
| 4,571,518 | * | 2/1986 | Kintz .................................. 310/68 R |
| 4,807,354 | * | 2/1989 | Capuano et al. ....................... 29/596 |
| 4,926,077 | * | 5/1990 | Gauthier et al. ................... 310/68 C |
| 5,343,613 | * | 9/1994 | Kintz .................................... 29/596 |
| 5,635,806 | | 6/1997 | Wissmach et al. . |
| 5,740,600 | * | 4/1998 | Ransberry ............................. 29/596 |

* cited by examiner

*Primary Examiner*—Nestor Ramirez
*Assistant Examiner*—Thanh Lam
(74) *Attorney, Agent, or Firm*—Carl Horton, Esq.; Damian Wasserbauer, Esq.; ArmstrongTeasdale LLP

(57) ABSTRACT

A motor including a plurality of temperature monitoring sensors is described. The temperature monitoring sensors are attached to stator coils and stator winding phases of the motor. The temperature monitoring sensors include a face side and a lead side which are positioned along the stator winding phases to properly monitor the motor temperature prior to insertion of the winding phases into a stator iron.

12 Claims, 4 Drawing Sheets

ELECTRIC MOTORS AND METHODS FOR ASSEMBLING TEMPERATURE SENSORS THEREIN

BACKGROUND OF THE INVENTION

This invention relates generally to electric motors and, more particularly, to methods for assembling temperature sensors in electric motors.

Electric motors typically include a stationary outer portion, a stator, which surrounds an inner portion, a rotor, which rotates utilizing magnetic fields. The stator includes stator coils and stator windings, with each stator coil wound around a respective stator winding, for example U.S. Pat. No. 5,045,742. Electrical current flows through the stator coil in the respective stator winding in a time sequential manner, which generates a stator magnetic field that repels/attracts a rotor magnetic field. The electrical current flowing through the stator constantly changes in time and direction, resulting in a constantly changing stator magnetic field. Due to the changing current direction and a resulting rotating stator magnetic field of constant magnitude, the rotor is caused to rotate and generate mechanical energy.

As more electrical current is directed to the motor and increasingly changed, the rotor is caused to rotate faster. However, heat is generated by the motor due to simple resistive losses, generating counter electromagnetic forces, and hysteresis losses. If the generated heat is not adequately monitored and conducted away from the motor, the stator windings will overheat causing a breakdown of motor insulation and a permanent loss of the stator magnetic fields and the rotor magnetic field, which results in an inoperable motor.

The known methods and apparatus for monitoring temperature increase the cost and complexity of the electric motors. Further, the utilization of these known methods and apparatus lack a high degree of precision and accuracy. Due to implementation, some of these known methods and apparatus fail to accurately monitor a temperature increase in the motor.

BRIEF SUMMARY OF THE INVENTION

It is therefore seen to be desirable to embed temperature monitoring sensors in an electric motor. In an exemplary embodiment of the invention, the temperature monitoring sensors are positioned and attached to stator winding phases prior to insertion of these phases into a stator iron of the motor.

More particularly, the temperature monitoring sensors are eight millimeter sensors which include a face side, utilized to detect a temperature increase/decrease, and a lead side, utilized to convey this information to a motor controller. Proper positioning of the eight millimeter sensors along the stator winding phases is predetermined prior to assembly of the motor.

A temperature monitoring motor is provided at a reduced cost in comparison to known temperature monitoring methods and apparatus. In addition, the temperature monitoring motor provides accurate and continual temperature monitoring.

DETAILED DESCRIPTION OF THE INVENTION

Figure 1:
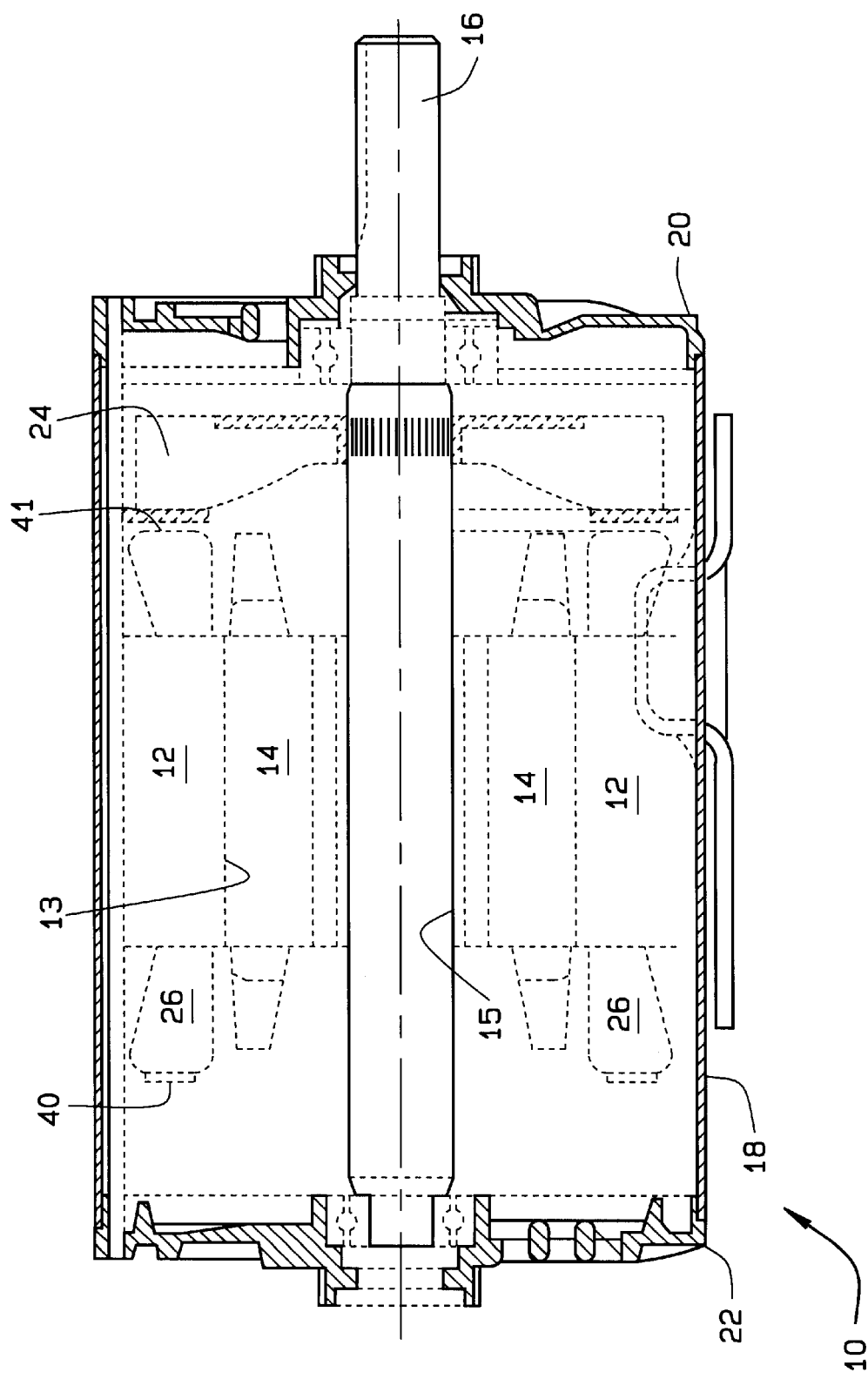
FIG. 1 is a cross-sectional view of an induction motor including stator coils.

FIG. 1 is a cross-sectional illustration of an electric motor 10 including a stator 12 including a bore 13 and a first stator winding phase (not shown), a second stator winding phase (not shown), and a third stator winding phase (not shown). A rotor core 14 is mounted within stator bore 13 and includes an opening 15 through which a shaft 16 is located. Motor 10 includes a shell 18, a first end shield 20, and a second end shield 22 which at least partially surrounds stator 12 and rotor core 14. A front fan 24 is attached to shaft 16 adjacent first end shield 20.

The first stator winding phase, the second stator winding phase, and the third stator winding phase include stator coils 26 which are wound around a stator iron (not shown). Stator coils 26 include a plurality of stator wires (not shown in FIG. 1) which at least partially surround at least one temperature sensor (not shown in FIG. 1). Each temperature sensor is attached to at least one of the first stator winding phase, the second stator winding phase, and the third stator winding phase prior to insertion into the stator iron.

In operation, electrical current flows through stator coils 26 to the first stator winding phase, the second stator winding phase, and the third stator winding phase in a time sequential manner. The change in time and direction of the current generates stator magnetic fields which repel/attract a rotor magnetic field generated by rotor core 14, and converts electrical energy into mechanical energy.

Figure 2:
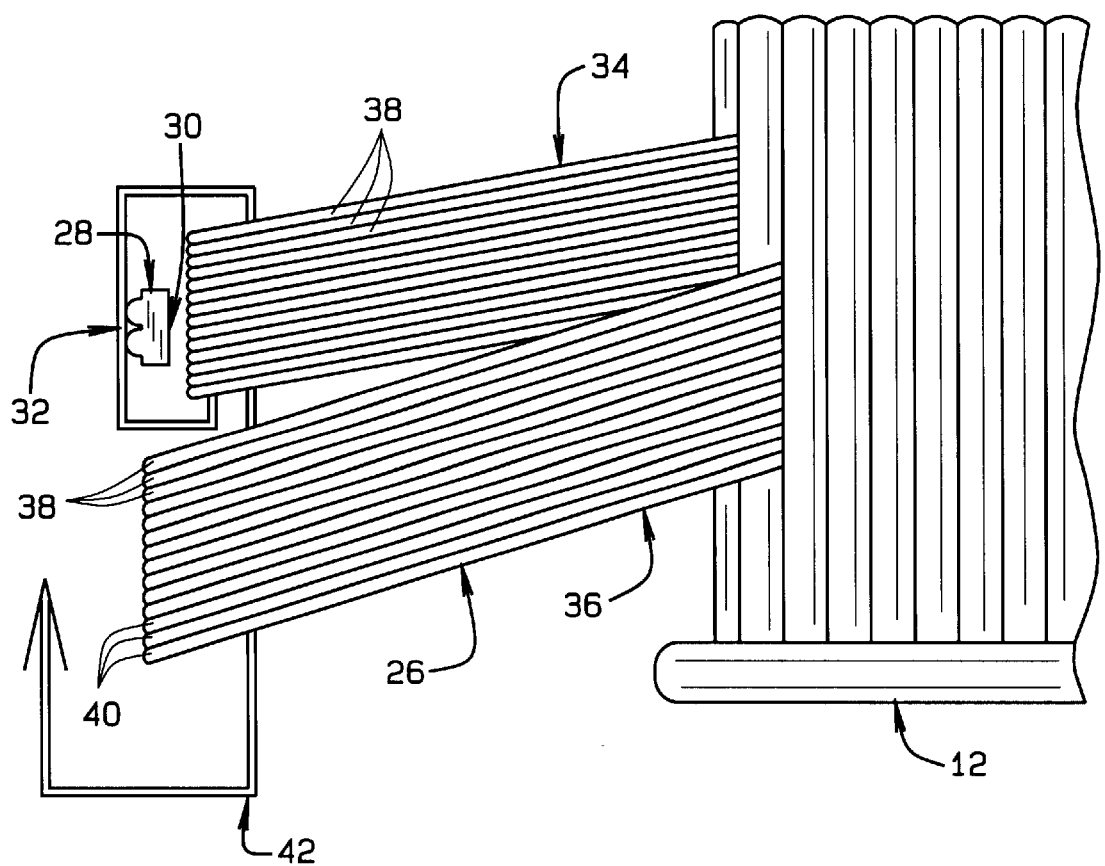
FIG. 2 is a schematic view of a stator coil including a temperature monitoring sensor in accordance with one embodiment of the present invention.

FIG. 2 is an illustration of stator coils 26 extending from stator 12. Stator coils 26 include a temperature monitoring sensor 28 which includes a face side 30 and a lead side 32. Stator coils 26 include an inner coil 34 and an outer coil 36. In one embodiment, temperature monitoring sensor 28 is an eight millimeter sensor which is commercially available from Thermik Geratebau Gmbh, Pforzheim, Germany. Stator coils 26 also include stator wires 38 which include a first end 40 and a second end (not shown). Sensor 28 is attached to inner coil 34 and outer coil 36 by a portion of tape 42 which extends around inner coil 34, outer coil 36, and sensor 28.

Figure 3:
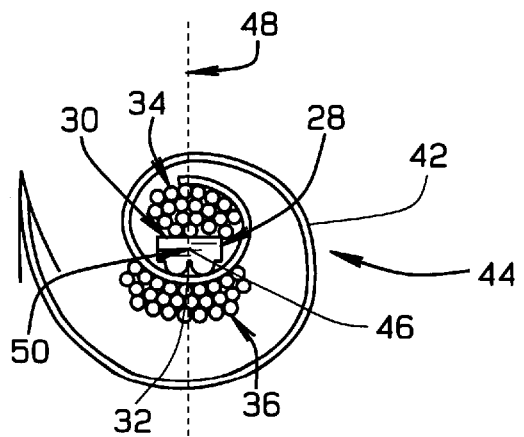
FIG. 3 is a schematic view of the temperature monitoring sensor attached to outer coil and an inner coil of the stator coil shown in FIG. 2.

FIG. 3 illustrates a coil bundle 44 formed by inner coil 34 attached to outer coil 36 and sensor 28. Coil bundle 44 includes a center 46 through which a vertical axis 48 extends. Coil bundle 44 further includes a bundle axis 50 which extends along stator wires 38 (shown in FIG. 2) and includes center 46.

During assembly of motor 10 (shown in FIG. 1) at least one temperature monitoring sensor 28 is attached to bundle 44 and is positioned along vertical axis 48 and bundle axis 50 such that sensor face side 30 is positioned toward inner coil 34. Alternatively, sensor face side 30 may be positioned toward outer coil 36. Sensor 28 can be positioned at first end 40 (shown in FIG. 2), the second end (not shown), or anywhere within coil bundle 44. Tape 42 can be tightly or loosely applied to inner coil 34, outer coil 36 and sensor lead side 32 in forming coil bundle 44. Bundle 44 is fabricated with sensor 28 properly positioned within coil bundle 44 and then inserted into a stator iron (not shown) prior to insertion into the stator iron (not shown).

Figure 4:
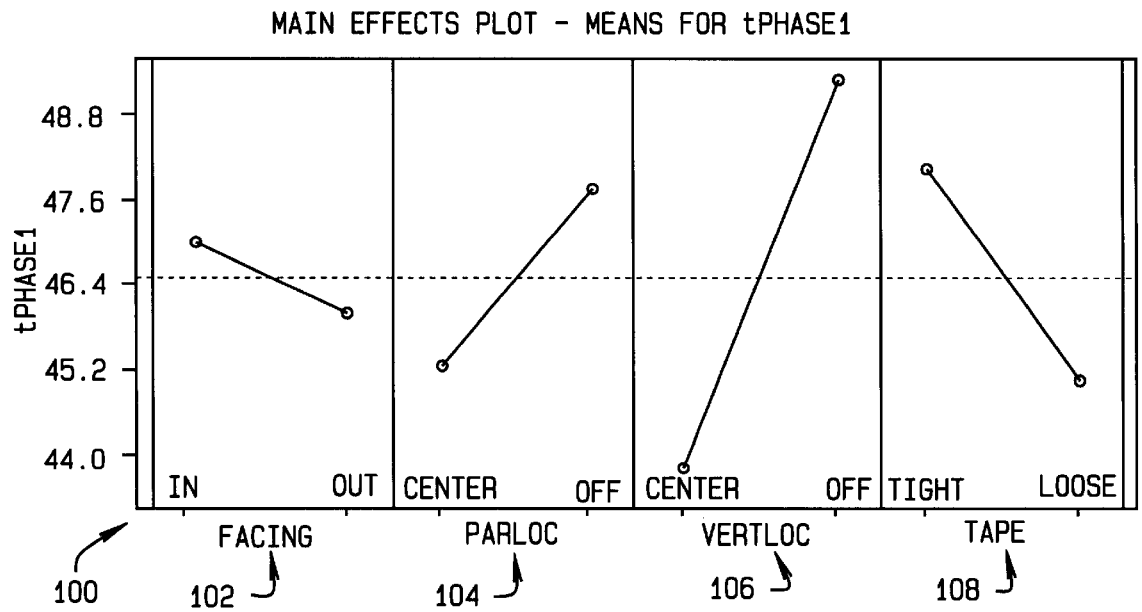
FIG. 4 is a time graph for various positions of the temperature monitoring sensor in a first winding phase of the motor shown in FIG. 1.

FIG. 4 illustrates a time graph 100 for various positions of temperature monitoring sensor 28 (shown in FIGS. 2 and 3) mounted in a first winding phase (not shown) of motor 10 (shown in FIG. 1). A triggering time of sensor 28 for monitoring overheating of motor 10 is denoted on a vertical axis in a number of seconds, beginning before forty-four seconds and ending after forty-eight and eight tenths seconds. A horizontal axis denotes the various positions of sensor 28 relative to the first winding phase.

Time graph 100 is divided into four sections which denote particular configurations of sensor 28. A first section 102 displays a relationship between the time in which sensor 28 detects excessive heat in the first winding phase based upon sensor face side 30 (shown in FIG. 3) facing toward inner coil 34 (shown in FIGS. 2 and 3) or outer coil 36 (shown in FIGS. 2 and 3). The term "facing", along with the terms "in" and "out" used in first section 102 denote sensor face side 30 positioned toward inner coil 34 or outer coil 36, respectively. For example, when sensor face side 30 is positioned toward inner coil 34, sensor 28 detects excessive heat in motor 10 in approximately forty-seven seconds. If sensor face side 30 is positioned facing toward outer coil 36, sensor 28 detects excessive heat in motor 10 in approximately forty-five and nine-tenths seconds. The target range of time for sensor 28 to detect excessive heat in motor 10 is between about forty-five seconds to about forty-seven seconds.

A second section 104 displays a relationship between the time in which sensor 28 detects excessive heat in the first winding phase of motor 10 based upon positioning of sensor 28 along bundle axis 50 (shown in FIG. 3). The term "parloc" denotes the parallel location of sensor 28 along bundle axis 50. The terms "center" and "off" used in second section 104 denote whether or not sensor 28 is positioned at center 46 of bundle 44. As shown in second section 104, sensor 28 detects excessive heat in the first winding phase of motor 10 in approximately forty-five and two tenths seconds when positioned at center 46. Whereas, sensor 28 detects excessive heat in approximately forty-seven and eight tenths seconds when positioned along axis 50, away from center 46.

A third section 106 displays a relationship between the time in which sensor 28 detects excessive heat in the first winding phase of motor 10 based upon positioning of sensor 28 along vertical axis 48 (shown in FIG. 3). The term "vertloc" denotes the vertical location of sensor 28 along vertical axis 48. The terms "center" and "off" used in third section 106 denote whether or not sensor 28 is positioned at center 46 of bundle 44. Sensor 28 detects excessive heat in the first winding phase of motor 10 in approximately forty-three and six tenths seconds when located at center 46. However, sensor 28 detects excessive heat in motor 10 in approximately forty-nine and two tenths seconds when positioned along axis 48, away from center 46.

A fourth section 108 displays a relationship between the time in which sensor 28 detects the excessive heat in the first winding phase of motor 10 and the manner in which sensor 28 is taped to form bundle 44, from tightly to loosely. The term "tape", along with the terms "tight" or "loose" used in fourth section 108 denote the manner in which sensor 28 is taped to bundle 44. Sensor 28 detects excessive heat in the first winding phase of motor 10 in approximately forty-seven and nine tenths seconds when taped tightly, and in approximately forty-four and eight tenths seconds when taped loosely.

Figure 5:
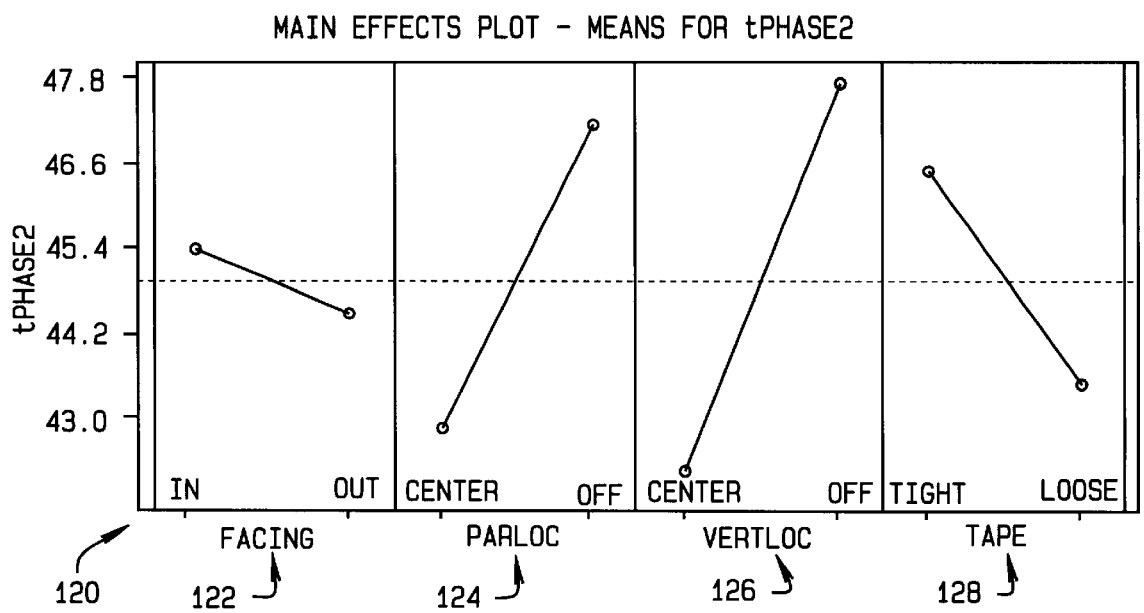
FIG. 5 is a time graph for various positions of the temperature monitoring sensor in a second winding phase of the motor shown in FIG. 1.

FIG. 5 illustrates a time graph 120 for various positions of temperature monitoring sensor 28 (shown in FIGS. 2 and 3) mounted in a second winding phase (not shown) of motor 10 (shown in FIG. 1). A triggering time of sensor 28 for monitoring overheating of motor 10 is denoted on a vertical axis in a number of seconds, beginning before forty-three seconds and ending after forty-seven and eight tenths seconds. A horizontal axis denotes the various positions of sensor 28 relative to the second winding phase.

Time graph 120 is divided into four sections which denote particular configurations of sensor 28. A first section 122 displays a relationship between the time in which sensor 28 detects excessive heat in the second winding phase based upon sensor face side 30 (shown in FIG. 3) facing toward inner coil 34 (shown in FIGS. 2 and 3) or outer coil 36 (shown in FIGS. 2 and 3). The term "facing", along with the terms "in" and "out" used in first section 122 denote sensor face side 30 positioned toward inner coil 34 or outer coil 36, respectively. When sensor face side 30 is positioned facing inner coil 34, in the second winding phase, sensor 28 detects excessive heat in motor 10 in approximately forty-five and two tenths seconds. If sensor face side 30 is positioned facing toward outer coil 36 sensor 28 detects excessive heat in motor 10 in approximately forty-four and six tenths seconds. The target range of time for sensor 28 to detect excessive heat in motor 10 is between about forty-five seconds to about forty-seven seconds.

A second section 124 displays a relationship between the time in which sensor 28 detects excessive heat in the second winding phase of motor 10 based upon positioning of sensor 28 along bundle axis 50 (shown in FIG. 3). The term "parloc" denotes the parallel location of sensor 28 along bundle axis 50. The terms "center" and "off" used in second section 124 denote whether or not sensor 28 is positioned at center 46 of bundle 44. As shown in second section 124, sensor 28 detects excessive heat in the second winding phase of motor 10 in approximately forty-two seconds when positioned at center 46. Whereas, sensor 28 detects excessive heat in approximately forty-seven and one tenth seconds when positioned along axis 50, away from center 46.

A third section 126 displays a relationship between the time in which sensor 28 detects excessive heat in the second winding phase of motor 10 based upon positioning of sensor 28 along vertical axis 48 (shown in FIG. 3). The term "vertloc" denotes the vertical location of sensor 28 along vertical axis 48. The terms "center" and "off" used in third section 126 denote whether or not sensor 28 is positioned at center 46 of bundle 44. Sensor 28 detects excessive heat in the second winding phase of motor 10 in approximately forty-two and six tenths seconds when located on center 46. However, sensor 28 detects excessive heat in motor 10 in approximately forty-seven and six tenths seconds when positioned along axis 48, away from center 46.

A fourth section 128 displays a relationship between the time in which sensor 28 detects excessive heat in the second winding phase of motor 10 and the manner in which sensor 28 is taped to form bundle 44, from tightly to loosely. The term "tape", along with the terms "tight" or "loose" used in fourth section 128 denote the manner in which sensor 28 is taped. Sensor 28 detects excessive heat in motor 10 in approximately forty-six and four tenths seconds when taped tightly, and in approximately forty-three and five tenths seconds when taped loosely.

Figure 6:
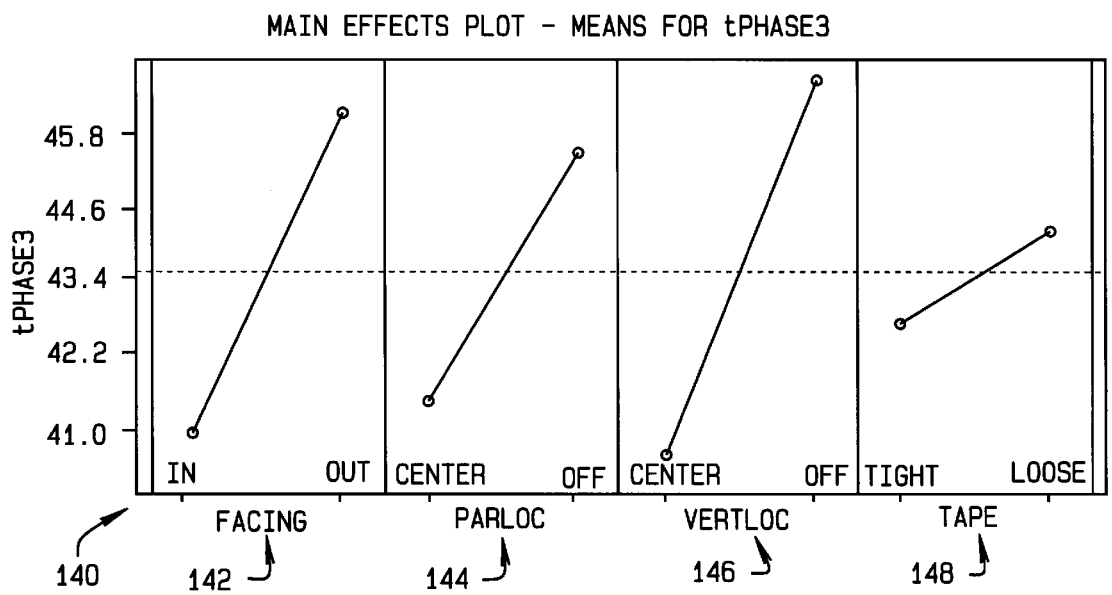
FIG. 6 is a time graph for various positions of the temperature monitoring sensor in a third winding phase of the motor shown in FIG. 1.

FIG. 6 illustrates a time graph 140 for various positions of temperature monitoring sensor 28 (shown in FIGS. 2 and 3) mounted in a third winding phase (not shown) of motor 10 (shown in FIG. 1). A triggering time of sensor 28 for monitoring overheating of motor 10 is denoted on a vertical axis in a number of seconds, beginning before forty-one seconds and ending after forty-five and eight tenths seconds. A horizontal axis denotes the various positions of sensor 28 relative to the third winding phase.

Time graph 140 is divided into four sections which denote particular configurations of sensor 28. A first section 142 displays a relationship between the time in which sensor 28 detects excessive heat in the third winding phase based upon sensor face side 30 (shown in FIG. 3) facing inner coil 34 (shown in FIGS. 2 and 3) or outer coil 36 (shown in FIGS. 2 and 3). The term "facing", along with the terms "in" and "out" used in first section 142 denote sensor face side 30 positioned toward inner coil 34 or outer coil 36, respectively. When sensor face side 30 is positioned toward inner coil 34, in the third winding phase, sensor 28 detects excessive heat in motor 10 in approximately forty seconds. If sensor face side 30 is positioned facing toward outer coil 36, in the third winding phase, sensor 28 detects excessive heat in motor 10 in approximately forty-six seconds. The target range of time for sensor 28 to detect excessive heat in motor 10 is between about forty-five seconds to about forty-seven seconds.

A second section 144 displays a relationship between the time in which sensor 28 detects excessive heat in the third winding phase of motor 10 based upon positioning of sensor 28 along bundle axis 50 (shown in FIG. 3). The term "parloc" denotes the parallel location of sensor 28 along bundle axis 50. The terms "center" and "off" used in second section 144 denotes whether or not sensor 28 is positioned at center 46 of bundle 44. As shown in second section 144, sensor 28 detects excessive heat in the third winding phase of motor 10 in approximately forty-one and five tenths seconds when positioned at center 46. Whereas, sensor 28 detects excessive heat in approximately forty-five and four tenths seconds when positioned along axis 50, away from center 46.

A third section 146 displays a relationship between the time in which sensor 28 detects excessive heat in the third winding phase of motor 10 based upon positioning of sensor 28 along vertical axis 48 (shown in FIG. 3). The term "vertloc" denotes the vertical location of sensor 28 along vertical axis 48. The terms "center" and "off" used in third section 126 denote whether or not sensor 28 is positioned at center 46 of bundle 44. Sensor 28 detects excessive heat in the third winding phase of motor 10 in approximately forty and seven tenths seconds when located on center 46. However, sensor 28 detects excessive heat in motor 10 in approximately forty-six and five tenths seconds when positioned along axis 48, away from center 46.

A fourth section 148 displays a relationship between the time in which sensor 28 detects excessive heat in the third winding phase of motor 10 and the manner in which sensor 28 is taped to bundle 44, from tightly to loosely. The term "tape", along with the terms "tight" or "loose" used in fourth section 148 denote the manner in which sensor 28 is taped. Sensor 28 detects excessive heat in motor 10 in approximately forty-two and eight tenths seconds when taped tightly, and in approximately forty-four and two tenths seconds when taped loosely.

Figure 7:
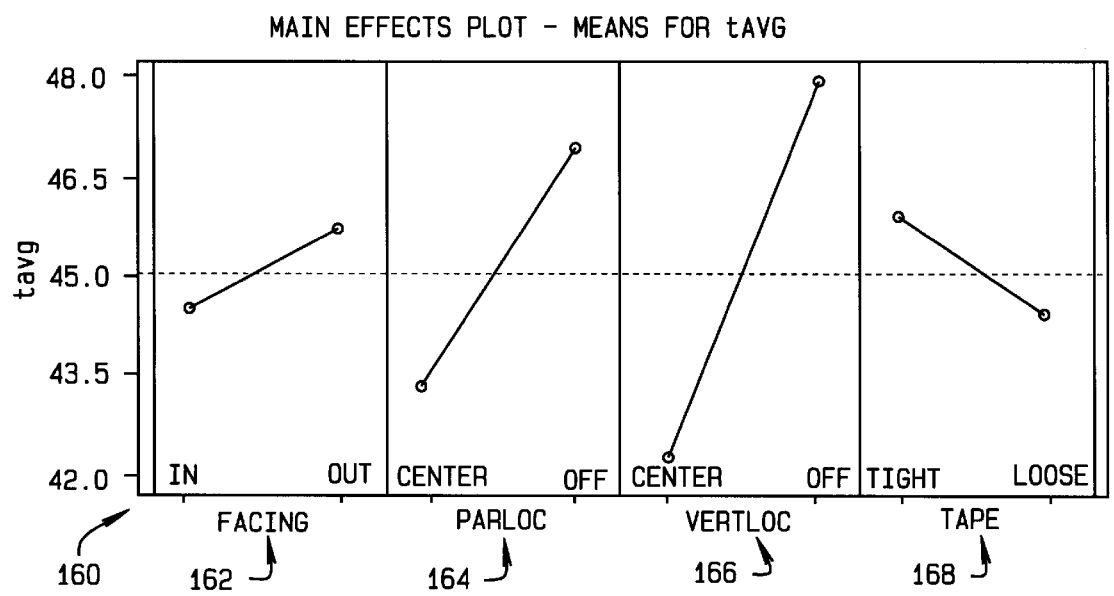
FIG. 7 is a mean time graph for various positions of the temperature monitoring sensor built into one of the stator winding phases of the motor shown in FIG. 1.

FIG. 7 illustrates a mean time graph 160 for various positions of temperature monitoring sensor 28 (shown in FIGS. 2 and 3) mounted in motor 10 (shown in FIG. 1). A mean triggering time of sensor 28 for monitoring overheating of motor 10 is denoted on a vertical axis in a number of seconds, beginning before forty-two seconds and ending after forty-eight seconds. A horizontal axis denotes the various positions of sensor 28 relative to the mean time of the first, second, and third winding phases.

Mean time graph 160 is divided into four sections which denote particular configurations of sensor 28. A first section 162 displays a relationship between the mean time in which sensor 28 detects excessive heat in motor 10 based upon sensor face side 30 (shown in FIG. 3) facing toward inner coil 34 (shown in FIGS. 2 and 3) or outer coil 36 (shown in FIGS. 2 and 3).

The term "facing", along with the terms "in" and "out" used in first section 162 denote sensor face side 30 positioned toward inner coil 34 or outer coil 36, respectively. When sensor face side 30 is positioned facing inner coil 34, the mean time for sensor 28 to detect excessive heat in motor 10 is approximately forty-four and four tenths seconds. If sensor face side 30 is positioned facing toward outer coil 36 sensor 28 detects excessive heat in motor 10 in approximately fifty seconds.

A second section 164 displays a relationship between the mean time in which sensor 28 detects excessive heat in motor 10 based upon positioning of sensor 28 long bundle axis 50 (shown in FIG. 3). The term "parloc" denotes the parallel location of sensor 28 along bundle axis 50. The terms "center" and "off" used in second section 164 denote whether or not sensor 28 is positioned at center 46 of bundle 44. As shown in second section 164, sensor 28 detects excessive heat in motor 10 in approximately forty-three and one tenth seconds when positioned at center 46. Whereas, sensor 28 detects excessive heat in approximately forty-six and eight tenths seconds when positioned along axis 50, away from center 46.

A third section 166 displays a relationship between the mean time in which sensor 28 detects excessive heat in motor 10 based upon positioning of sensor 28 along vertical axis 48 (shown in FIG. 3). The term "vertloc" denotes the vertical location of sensor 28 along vertical axis 48. The terms "center" and "off" used in third section 166 denotes whether or not sensor 28 is positioned at center 46 of bundle 44. Sensor 28 detects excessive heat in motor 10 in approximately forty-two and one tenth seconds when located at center 46. However, sensor 28 detects excessive heat in motor 10 in approximately forty-seven and six tenths seconds when positioned along axis 48, away from center 46.

A fourth section 168 displays a relationship between the mean time in which sensor 28 detects excessive heat in motor 10 and the manner in which sensor 28 is taped to bundle 44, from tightly to loosely. The term "tape", along with the terms "tight" or "loose" used in fourth section 168 denote the manner in which sensor 28 is taped to bundle 44. As shown in fourth section 168, sensor 28 detects excessive heat in motor 10 in approximately forty-five and eight tenths seconds when taped tightly, and in approximately forty-four and four tenths seconds when taped loosely.

During initial assembly of motor 10, sensor 28 is attached to stator coils 26 to provide a reduced cost temperature monitoring motor. As demonstrated by time graphs 100, 120, 140, and mean time graph 160, positioning of sensor 28 in the first winding phase, the second winding phase, or the third winding phase of motor 10 determines the speed and accuracy of the temperature monitoring.

While the invention has been described in terms of various specific embodiments, those skilled in the art will recognize that the invention can be practiced with modification within the spirit and scope of the claims.

What is claimed is:

1. A method for assembling a motor including a stator and a rotor partially surrounded by a shell, the stator including a plurality of stator coils, and at least one temperature sensor including a face side and a lead side, each stator coil including a plurality of stator wires, said method comprising steps of:

attaching the at least one temperature sensor to at least one of the stator coils such that each temperature sensor is positioned on the stator coils;

surrounding each temperature sensor with the plurality of stator wires; and assembling the motor utilizing the attached plurality of temperature sensors and stator coils.

2. A method in accordance with claim 1 wherein each stator coil includes an inner coil, said step of positioning each temperature sensor comprises the step of positioning the face side of each temperature sensor towards the inner coil.

3. A method in accordance with claim 1 wherein each stator coil includes an outer coil, said step of positioning each temperature sensor comprises the step of positioning the face side of each temperature sensor towards the outer coil.

4. A method in accordance with claim 1 wherein the stator includes a stator coil bundle, the bundle includes a center, said step of positioning each temperature sensor comprises the step of positioning each temperature sensor on the center of the stator coil bundle.

5. A method in accordance with claim 1 wherein the stator includes a stator coil bundle, including a center, said step of positioning each temperature sensor comprises the step of positioning each temperature sensor away from the center of the stator coil bundle.

6. A method in accordance with claim 1 wherein each stator coil further includes a first end, said step of positioning each temperature sensor comprises the step of positioning each temperature sensor in close proximity to the first end of the stator coil.

7. A method in accordance with claim 1 wherein each stator coil further includes a second end, said step of positioning each temperature sensor comprises the step of positioning each temperature sensor in close proximity to the second end of the stator coil.

8. A method in accordance with claim 1 wherein each stator coil further includes a center, said step of positioning each temperature sensor comprises the step of positioning each temperature sensor at the center of the stator coil.

9. A method for assembling a motor including a stator, a rotor, and at least one temperature sensor including a face side and a lead side, the stator including at least two stator winding phases and a plurality of stator wires, said method comprising steps of:

attaching the at least one temperature sensor to at least one stator winding phase such that each temperature sensor is positioned on the stator wires;

surrounding the at least one temperature sensor with the plurality of stator wires;

positioning the at least one temperature sensor on the at least one stator winding phase;

inserting the at least one stator winding phase into the stator iron; and assembling the motor.

10. A method in accordance with claim 9 wherein each stator winding phase includes at least one phase endcoil, said step of attaching the at least one temperature sensor comprises the step of attaching the at least one temperature sensor to the at least one phase endcoil.

11. A method in accordance with claim 10 wherein said step of attaching a temperature sensor to a stator endcoil comprises the step of taping the at least one temperature sensor to the at least one phase endcoil prior to insertion of the phase endcoil in the stator iron.

12. A method in accordance with claim 11 wherein said step of taping the at least one temperature sensor comprises the step of positioning the sensor on the at least one phase endcoil.

* * * * *